(12) United States Patent
Condorelli et al.

(10) Patent No.: US 8,977,902 B2
(45) Date of Patent: Mar. 10, 2015

(54) INTEGRITY CHECKING INCLUDING SIDE CHANNEL MONITORING

(71) Applicant: International Business Machines Corporation, Armonk, NY (US)

(72) Inventors: Vincenzo Condorelli, Poughkeepsie, NY (US); Silvio Dragone, Winterthur (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/659,207

(22) Filed: Oct. 24, 2012

(65) Prior Publication Data

US 2014/0115405 A1 Apr. 24, 2014

(51) Int. Cl.
*G06F 11/00* (2006.01)
*G06F 21/55* (2013.01)

(52) U.S. Cl.
CPC .................................. *G06F 21/556* (2013.01)
USPC ........................................................ 714/27

(58) Field of Classification Search
CPC .............................. G06F 21/556; G06F 21/554
See application file for complete search history.

(56) References Cited

U.S. PATENT DOCUMENTS

| 8,171,282 | B2 | 5/2012 | Amann et al. | |
|---|---|---|---|---|
| 8,443,101 | B1 * | 5/2013 | Geissler et al. | 709/235 |
| 2007/0019805 | A1 * | 1/2007 | Karpovsky et al. | 380/28 |
| 2014/0075203 | A1 * | 3/2014 | Barbu et al. | 713/189 |

FOREIGN PATENT DOCUMENTS

FR 2995429 * 9/2012 ............. G06F 21/57

OTHER PUBLICATIONS

Microsoft Computer Dictionary, Microsoft Press, 1999, p. 84.*
Agrawal, et al., "The EM Side-channel(s): Attacks and Assessment Methodologies". In CHES '02: Proceedings of the 4th International Workshop on Cryptographic Hardware and Embedded Systems, pp. 29-45. 2002.
Brumley, et al. "Remote Timing Attacks are Still Practical". In Vijay Atluri and Claudia Diaz, editors, ESORICS, vol. 6879 of Lecture Notes in Computer Science, pp. 355-371. Springer, 2011.
Brumley, et al. "Remote Timing Attacks are Practical". In Proceedings of the 12th USENIX Security Symposium, pp. 1-14, 2003.
Carlough, et al. "The IBM zEnterprise-196 Decimal Floating-Point Accelerator". 2011 20th IEEE Symposium on Computer Arithmetic. pp. 139-146. Jul. 2011.
Coarfa, et al. "Performance Analysis of TLS Web Servers". ACM Transactions on Cumputer Systems (TOCS), 24 (1): pp. 39-69, 2006.

(Continued)

*Primary Examiner* — Christopher McCarthy
(74) *Attorney, Agent, or Firm* — Cantor Colburn LLP; Daniel Morris

(57) ABSTRACT

A method for integrity checking for a cryptographic engine in a computing system includes monitoring a state of a side channel of the cryptographic engine during operation of the cryptographic engine by a side channel monitor; comparing the state of the side channel to a side channel model of the cryptographic engine to determine whether a mismatch exists between the state of the side channel and the side channel model; and based on a mismatch between the state of the side channel and the model of the side channel, indicating an error in the cryptographic engine.

21 Claims, 4 Drawing Sheets

(56) References Cited

OTHER PUBLICATIONS

Kocher, et al. "Differential Power Analysis". In Michael Weiner, editor, Advances in Crytology CRYPTO'99, vol. 1666 of Lecture Notes in Computer Science, pp. 789-799. Springer Berlin/Heidelberg, 1999.

Lyu, et al. "Assuring Design Diversity in N-version Software: A Design Paradigm for N-version Programming", In Proceedings 2nd IEEE International Working Conference on Dependable Computing for Critical Applications (DCCA'91), pp. 197-218, 1991.

National Institute of Standards and Technology. "Digital Signature Standard". Federal Information Processing Standards Publication 186-3, pp. 1-130, Jun. 2009.

Walter, "Data Integrity in Hardware for Modular Arithmetic". In Cetin Kaya Koc and Christof Paar, editors, CHES'02, vol. 1965 of Lecture Notes in Computer Science, pp. 204-215. Springer, 2000.

Walter, et al. "Distinguishing Exponent Digits by Observing Modular Subtractions". In Proceedings of the 2001 Conference on Topics in Cryptology: The Cryptographer's Track at RSA, CT-RSA 2001, pp. 192-207, London, UK, 2001. Springer-Verlag.

* cited by examiner

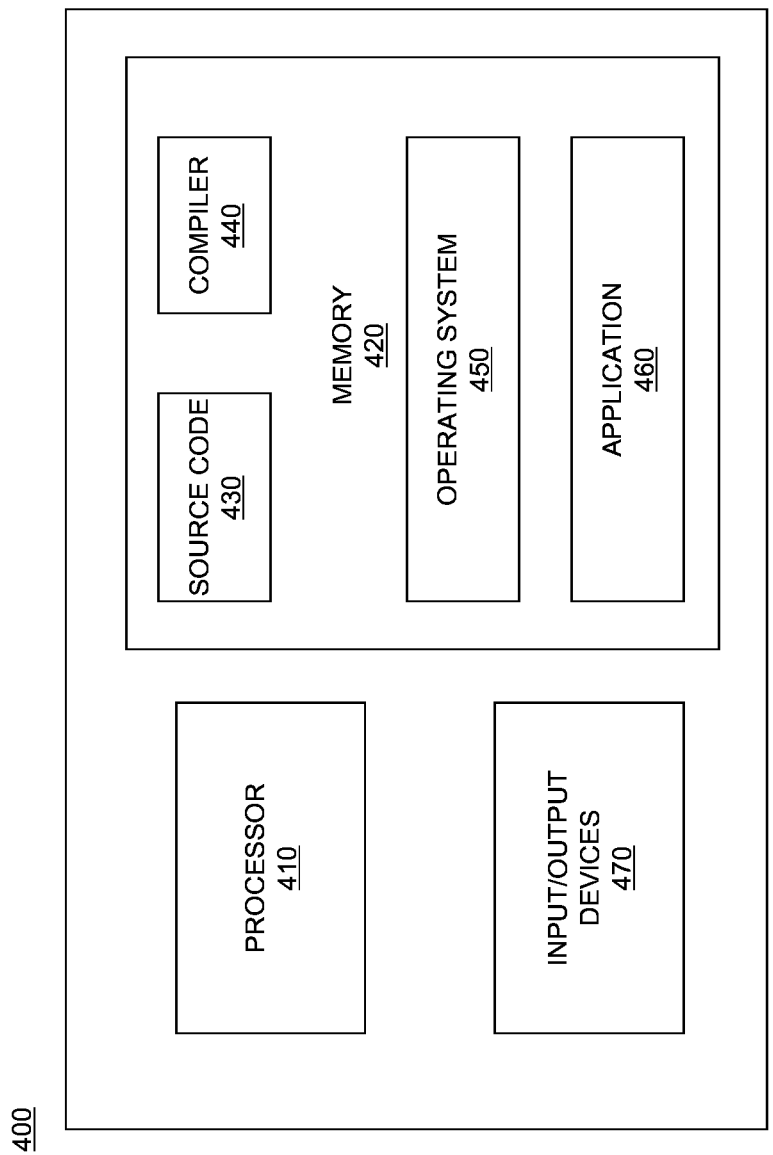

INTEGRITY CHECKING INCLUDING SIDE CHANNEL MONITORING

BACKGROUND

This disclosure relates generally to computing systems, and more specifically to integrity checking for a computing system including side channel monitoring.

Computing systems used for secure data storage applications may require integration with engines that run cryptographic algorithms for data security. However, integrating cryptographic engines into relatively large-scale storage systems with enterprise data resiliency requirements may be problematic. A cryptographic engine may emphasize raw performance and/or low resource usage over data integrity checking that may be needed to ensure proper execution of the cryptographic algorithm. As cryptographic algorithms and protocols may amplify the impact of any errors that occur in the stored data, a lack of integrity checking may be particularly damaging to data integrity when working with encrypted data.

To enable an enterprise storage system to process large encrypted databases while maintaining data integrity, any lack of data integrity protection in the cryptographic engine must be compensated for. Data replication may be used for integrity protection in some systems; however, replication may only be feasible if the system has at least double the resources that are required, and may further require synchronized multiprocessing of operations, which may be complex to implement. On embedded systems that work with sensitive data, such as hardware security modules, smartcards, or other embedded high-assurance environments, power and other resource constraints may prohibit use of replication. Another type of integrity checking includes use of checksums that are generated by the cryptographic algorithm engine during operation. These checksums may be monitored to determine the presence of errors in the operation of the system. However, such checksum generation may not provide sufficient integrity protection for some enterprise storage systems. Cryptographic engine implementations may also contain side channels, which are unintended channels that reveal information regarding intermediate states of cryptographic computation. Side channels are undesirable, as encrypted data may be exposed indirectly via a side channel, even if the full internal state of the cryptographic engine may not be observable from outside the engine.

SUMMARY

In one aspect, a method for integrity checking for a cryptographic engine in a computing system includes monitoring a state of a side channel of the cryptographic engine during operation of the cryptographic engine by a side channel monitor; comparing the state of the side channel to a side channel model of the cryptographic engine to determine whether a mismatch exists between the state of the side channel and the side channel model; and based on a mismatch between the state of the side channel and the model of the side channel, indicating an error in the cryptographic engine.

In another aspect, a computer program product includes a computer readable storage medium containing computer code that, when executed by a computer, implements a method for integrity checking for a cryptographic engine in a computing system, wherein the method includes monitoring a state of a side channel of the cryptographic engine during operation of the cryptographic engine by a side channel monitor; comparing the state of the side channel to a side channel model of the cryptographic engine to determine whether a mismatch exists between the state of the side channel and the side channel model; and based on a mismatch between the state of the side channel and the model of the side channel, indicating an error in the cryptographic engine.

In yet another aspect, a computer system for integrity checking for a cryptographic engine in a computing system includes a processor; and a memory, the system configured to perform a method including monitoring a state of a side channel of the cryptographic engine during operation of the cryptographic engine by a side channel monitor; comparing the state of the side channel to a side channel model of the cryptographic engine to determine whether a mismatch exists between the state of the side channel and the side channel model; and based on a mismatch between the state of the side channel and the model of the side channel, indicating an error in the cryptographic engine.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 4 is a schematic block diagram illustrating an embodiment of a computer that may be used in conjunction with systems and methods for integrity-checking including side channel monitoring.

DETAILED DESCRIPTION

Figure 1:
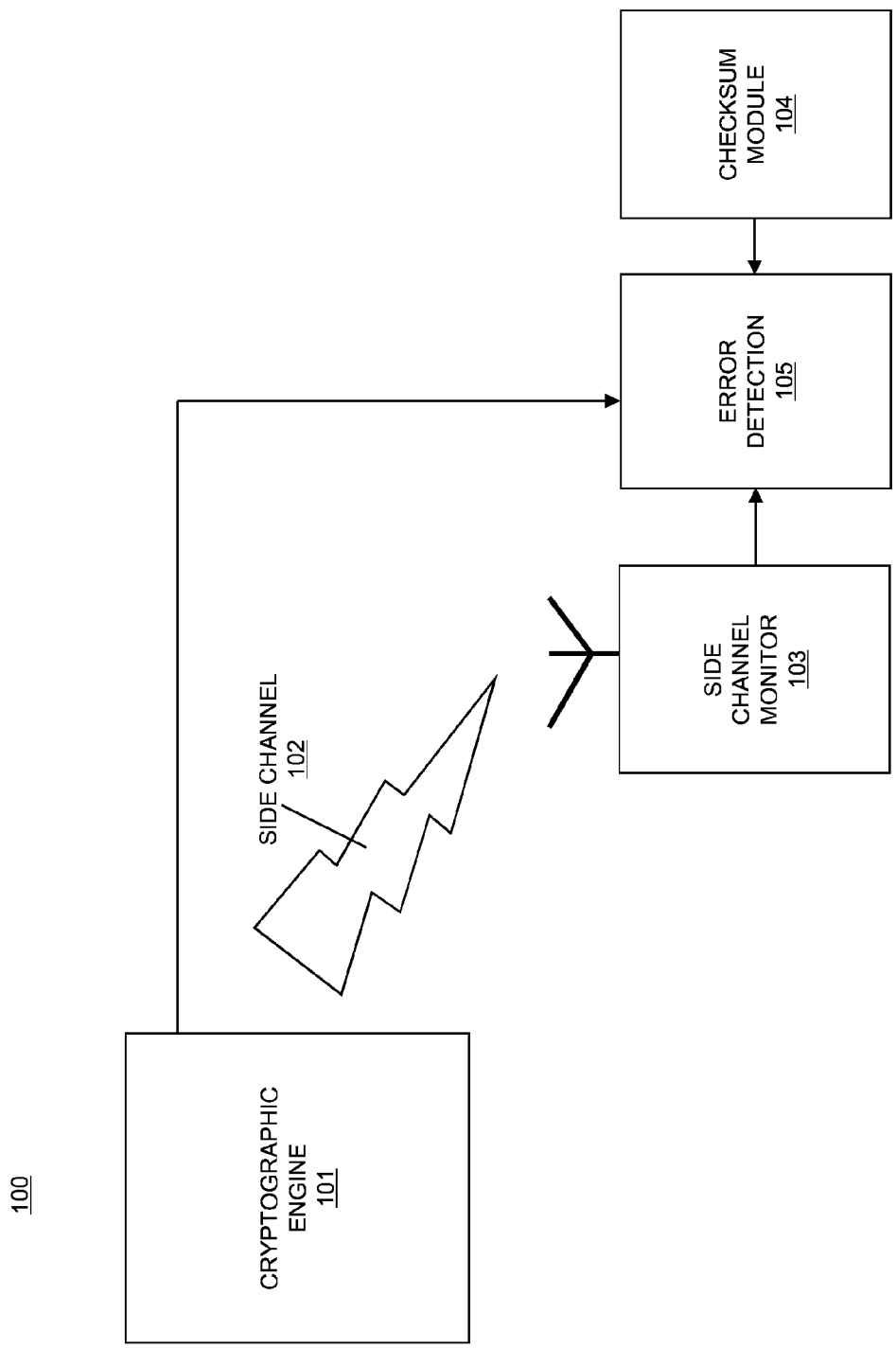
FIG. 1 is a schematic block diagram illustrating an embodiment of an integrity-checking system including side channel monitoring.

Embodiments of systems and methods for integrity checking including side channel monitoring are provided, with exemplary embodiments being discussed below in detail. Checksum-based integrity checking may be augmented through monitoring of side channels that are present during the operation of the cryptographic engine. A side channel model for the cryptographic engine may be constructed, and, during operation of the cryptographic engine, the state of the side channel as determined by the side channel monitor may be compared to the side channel model. A mismatch between the side channel state and the side channel model during operation of the cryptographic engine may indicate the presence of errors. The side channel monitor information is thereby used to form an augmented checksum for the cryptographic engine. In addition, the side channel monitor may be used to compensate for the side channel, thereby increasing data security in the system.

A side channel may include cryptographic implementation side effects or unintended information leaks that may unintentionally reveal information regarding the cryptography scheme of a data storage system during operation. A cryptographic engine may leak information through side channels including but not limited to timing, power consumption, and electromagnetic radiation information, or combinations thereof. Such side channels reveal auxiliary information regarding the cryptography engine, eroding effective cryptographic strength and potentially leading to disclosure of sensitive data by the encrypted data storage system. However, as elimination of side channels in a cryptographic engine may result in reduced performance and increase resource usage by the cryptographic engine, many cryptographic engines may be implemented without effective side channel countermeasures.

When a cryptographic engine with suspected or known side channels is integrated into a high-assurance data storage system, the side channels may be monitored and compensated. As an example, a side channel comprising data-dependent timing may be made uniform through selectively inserted dummy operations, and power consumption may be masked by activating a parallel workload if the engine is idle. Some side channel compensation may be performed in parallel with cryptographic engine operations. For example, power compensation countermeasures may perform masking computations in parallel with regular engine operations if the engine power profile is externally observed to be data-dependent. Other side channel compensation, such as extending aggregate latencies to data-independent, uniform values, may be post-compensated. The side channel monitoring and compensation information may also be for integrity checking, enhancing the overall integrity of the system. In various embodiments, side channel monitoring may be used for integrity checking in the absence of side channel compensation, or in conjunction with side channel compensation.

The cryptographic engine may calculate a series of checksums during operation that are checked against, for example, an external checksum store to determine errors, allowing implementation even in resource-constrained, such as embedded, systems. However, the calculated checksums may be relatively short, due to various system constraints. Such checksums may be effective for catching single-bit errors, but coverage of multi-bit errors is limited, as there are only a few possible checksum values for the checksums, and the chance of multi-bit errors resulting in an accidentally matching checksum is non-negligible. Therefore, while such locally generated and verified checksums may detect some errors, the side channel information augments the error detection provided by the checksums, as the data that is exposed through the side channel provides a different kind of error coverage than the calculated checksum. Both the calculated checksum and the side channel state may be inspected, and the cryptographic engine output may be flagged as corrupted if either checksum or the side channel state indicates the presence of errors. Integrity checking that includes both checksum calculation and side channel monitoring gives better error coverage than a single checksum, while using essentially free information that is also used for side channel compensation.

To detect errors in the side channel state, the side channel state information that is determined by the side channel monitor is compared to a side channel model during operation of the cryptographic engine. The side channel model may be adapted to the particular cryptographic engine that is being used, so as to accurately predict and detect errors in the side channel state. The side channel model may be constructed during integration of the cryptographic engine into the data storage system. Indirect knowledge of the properties of the particular cryptographic engine may be required to construct the side channel model. While such knowledge may not be readily available, side channel properties may be detected during integration of the cryptographic engine into the data storage system based on one or more detectors, and/or based on documentation of the cryptographic engine. The side channel monitor detects side channels of the integrated cryptographic engine, and collects representative traces of observed side-channel state, aggregated over time. A side channel model may track the stored traces of the side channel state, and predict side channel behavior based an offline-constructed model of the side channel state. Side channel compensation based on the side channel monitor may optionally be performed either during computation, or after engine stop, depending on the nature of the side channel and observability of the side-channel state.

FIG. 1 illustrates an embodiment of an integrity-checking system 100 including side channel monitoring. System 100 may be used in conjunction with a computer data storage system. System 100 includes cryptographic engine 101 with side channel 102, side channel monitor 103, checksum module 104, and error detection module 105. Cryptographic engine 101 may comprise any appropriate computing equipment. Side channel 102 comprises information that is leaked by the cryptographic engine 101 by the operation of the cryptographic engine 101; this may include, but is not limited to, power consumption, timing, or electromagnetic data. The cryptographic engine 101 may have multiple side channels of any appropriate type in various embodiments. The side channel monitor 103 detects and monitors the state of side channel 102. The detection of the side channel 102 by the side channel monitor 103 may be performed in any appropriate manner. The cryptographic engine 101 also calculates a series checksums during operation; these checksums are provided to error detection module 105 and compared to a checksum base that is stored in checksum module 104. The error detection module 105 determines whether the checksum from cryptographic engine 101 matches the checksum from checksum module 104, and if the two checksums do not match, an error in cryptographic engine 101 is indicated. In addition, the error detection module 105 determines whether the state of the side channel 102 matches a side channel model based on the information from side channel monitor 103. If the state of the side channel 102 as detected by side channel monitor 103 is determined not to match the side channel model, an error in cryptographic engine 101 is also indicated. The side channel model may be constructed during integration of the cryptographic engine 101 with the data storage system in some embodiments. FIG. 1 is shown for illustrative purposes only; an integrity-checking system including side channel monitoring may have any appropriate configuration in various embodiments, and may, for example, include multiple side channels and side channel monitors in some embodiments.

Figure 2:
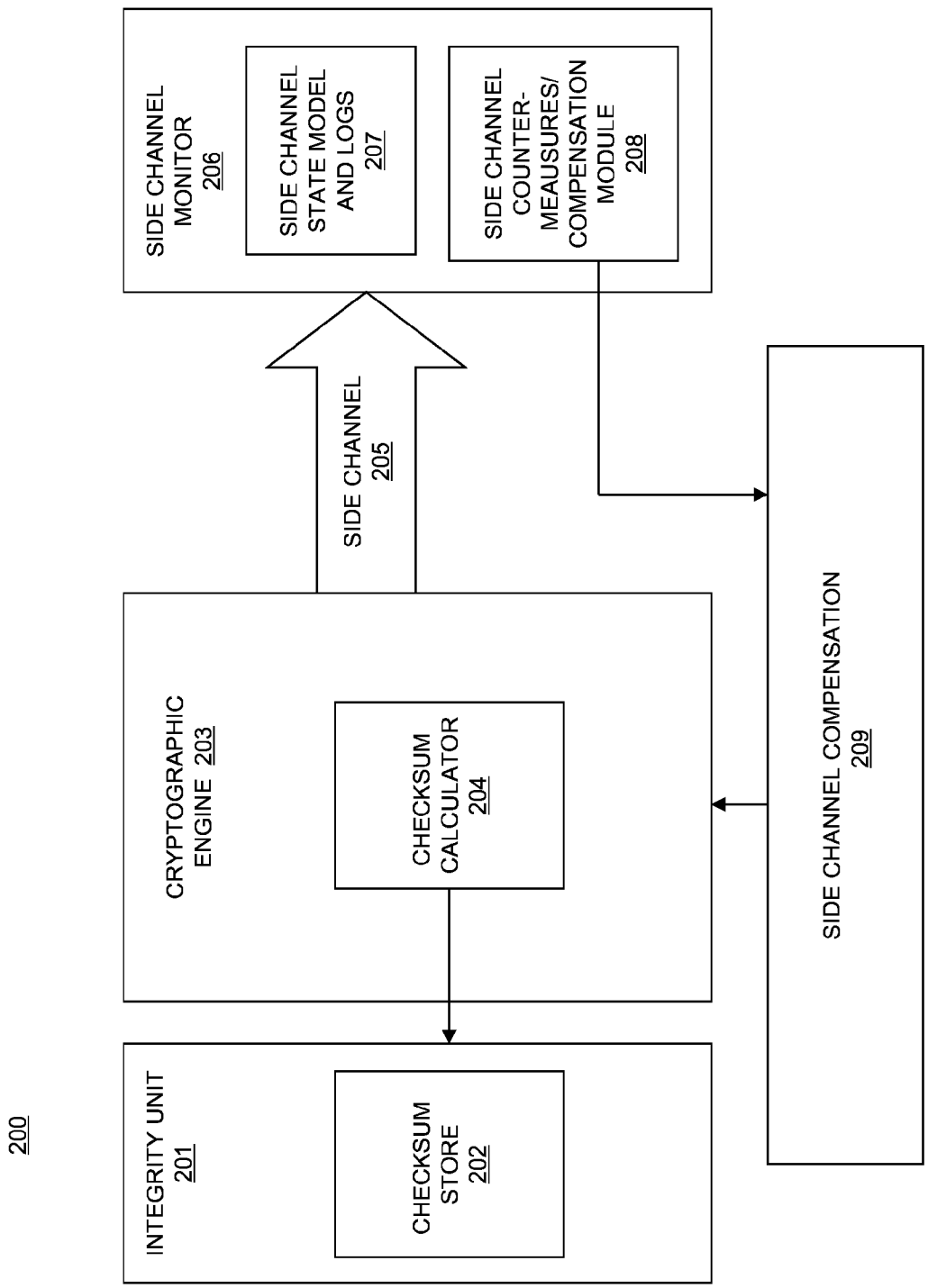
FIG. 2 is a schematic block diagram illustrating an embodiment of an integrity-checking system including side channel monitoring and side channel compensation.

FIG. 2 illustrates an embodiment of an integrity-checking system 200 including side channel monitoring and side channel compensation. System 200 includes integrity unit 201, which holds checksum store 202; Cryptographic engine 203, which includes checksum calculator 204 and emits side channel 205; side channel monitor 206, which includes side channel state model and logs 207 and side channel counter-measures and compensation module 208; and side channel compensation 209. Integrity unit 201 may store a precalculated base of relatively short checksums in checksum store 202, or may calculate a series of checksums in parallel with checksum calculator 204. During operation, the checksum calculator 204 in cryptographic engine 203 calculates a series of relatively long checksums, and these calculated checksums from checksum calculator 204 are checked against the stored checksums in checksum store 202. If there is a mismatch between the calculated checksums from checksum calculator 204 and the stored checksums from checksum store 202, an error in the operation of cryptographic engine 203 may be indicated by integrity unit 201.

Side channel 205 is also present during operation of cryptographic engine 203. Side channel 205 may include, but is not limited to, power consumption, timing, or electromagnetic data. The side channel monitor 206 monitors the state of side channel 205. The state of side channel 205 as determined by side channel monitor 206 is compared to side channel state model and logs 207. Side channel state model and logs 207 may be constructed during integration of system 200 into a computer data storage system in some embodiments. If there is a mismatch between the state of side channel 205 and side channel state model and logs 207, the side channel monitor 206 indicates an error in the operation of cryptographic engine 203. The side channel counter-measures and compensation module 208 determines appropriate actions to take to compensate for side channel 205 during operation of the cryptographic engine 203, and instructs side channel compensation 209 to perform the compensation measures. The compensation measures may include dummy calculations performed by cryptographic engine 203 to hide variations in power consumption, timing, or electromagnetic emissions by cryptographic engine 203 in some embodiments. FIG. 2 is shown for illustrative purposes only; an integrity-checking system including side channel monitoring and side channel compensation may have any appropriate configuration in various embodiments, and may, for example, including multiple side channels and side channel monitors in some embodiments.

In some embodiments, a checksum calculator 204 may calculate the checksums as is shown below in Table 1, using modular exponentiation, which is a building block of some public key encryption systems. Table 1 shows one of the intermediate multiplication steps of a long modular multiplication, which is a part of a modular exponentiation. Such modular multiplication performs a sequence of multiply-add steps, processing accumulated bignumbers (R[n]), a base and modulus (A, N, both bignumbers) and words of the exponent (b[n], a word of w bits). Each step updates the accumulator with two additions of word-by-bignumber terms.

TABLE 1

1. R'[n] := R[n] + b[n] * A
   1.1. q := least significant word( R'[n] )
2. R'[n+1] := (R'[n] + q * N) >> w
3. R[n+1] :=  R'[n+1] if R'[n+1] < N;
               R'[n+1] − N otherwise The full modular exponentiation shown in Table 1 works with bignumbers, which may include thousands of bits, while calculating $A^B(\mod N)$, with considerable computational and resource consumption. An effective integrity-checking addition is to calculate a much shorter modular exponentiation in parallel, using a short modulus (D in Table 1, D<<N). The calculation of $A^B(\mod D)$ may be performed on word or shorter units, with certain D values offering further optimization possibilities. The parallel $A^B(\mod D)$ calculation may be performed in, for example, an external checksum module, which may comprise an asynchronous submodule that does not interface with cryptographic engine operations before the final checksum comparison. This external checksum module may comprise, for example, checksum module 104 of FIG. 1, or integrity unit 201 and checksum store 202 in FIG. 2.

Figure 3:
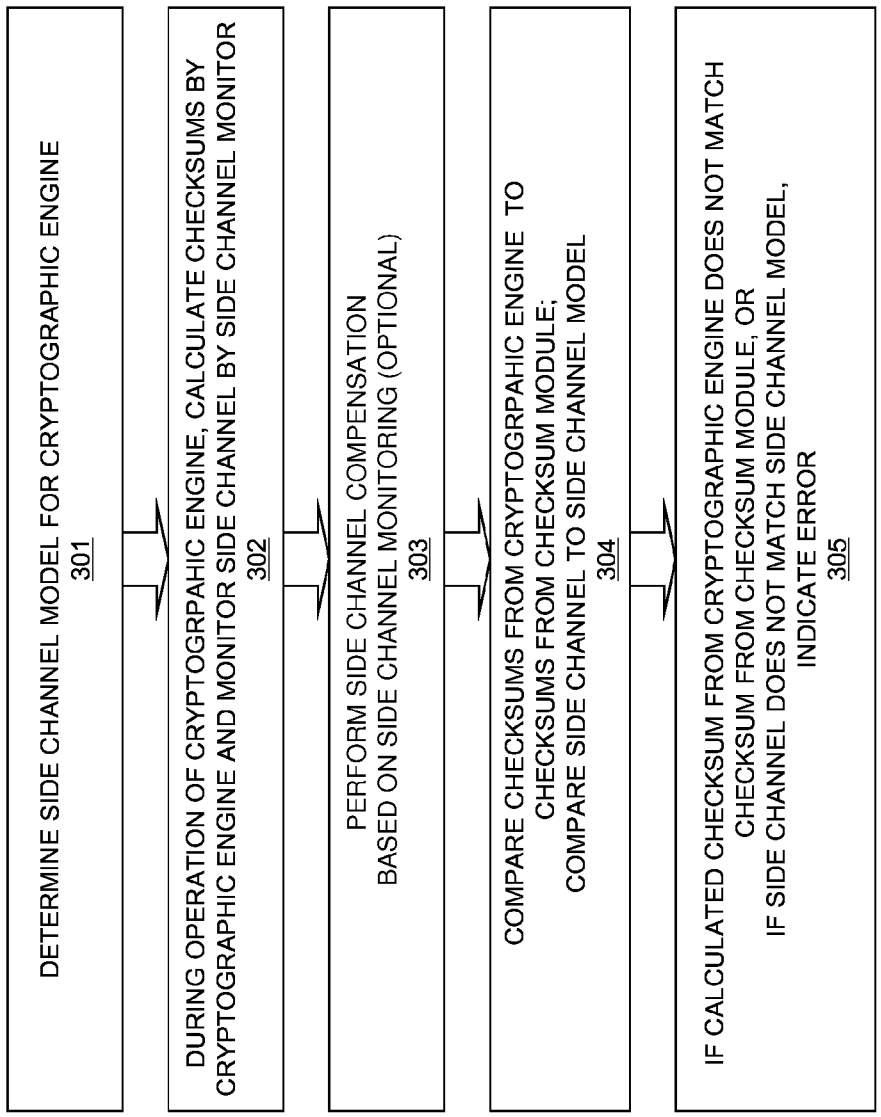
FIG. 3 is a flowchart illustrating an embodiment of a method for integrity checking including side channel monitoring.

FIG. 3 illustrates an embodiment of a method 300 for integrity-checking including side channel monitoring for a cryptographic engine. FIG. 3 is discussed with respect to FIGS. 1 and 2. First, in block 301, a side channel model is determined for the cryptographic engine. The side channel model may be determined offline for a particular cryptographic engine during integration of the cryptographic engine into a data storage system in some embodiments. The side channel model may be determined based on any available information regarding the cryptography engine; for example, information from one or more detectors, or documentation. The determined side channel model may then be stored in, for example, an error detection module 105 such as is shown in FIG. 1, or in a side channel state model and logs module 207 in side channel monitor 206 as is shown in FIG. 2.

Then, flow of method 300 proceeds to block 302, during which the cryptographic engine (for example, cryptographic engine 101 of FIG. 1, or cryptographic engine 203 of FIG. 2) operates. During operation of the cryptographic engine, the cryptographic engine calculates a series of checksums. There is also a side channel (such as side channel 102 of FIG. 1 or side channel 205 of FIG. 2) present during operation of the cryptographic engine; this side channel is monitored by, for example, side channel monitor 103 of FIG. 1, or side channel monitor 206 of FIG. 2. The side channel may comprise, for example, power consumption, timing, or electromagnetic emission information from the cryptographic engine. Next, during optional block 303 of FIG. 3, in some embodiments, side channel countermeasures may be performed to mask the side channel during operation of the cryptographic engine based on the monitoring of the side channel (for example, by side channel compensation 209 of FIG. 2). The countermeasures may include dummy operations that are performed by the cryptographic engine to mask the side channel in some embodiments.

Next, in block 304 of FIG. 3, the checksums calculated by the cryptographic engine during operation, as described with respect to block 302, are compared to a set of checksums in an external checksum module (for example, checksum module 104 of FIG. 1, or checksum store 202 in integrity unit 201 of FIG. 2). The state of the side channel as determined by the side channel monitor during block 302 of FIG. 3 is also compared to the side channel model that was constructed in block 301 of FIG. 3. Lastly, in block 305 of FIG. 3, if either the calculated checksum from the cryptographic engine does not match the checksum from the external checksum module, or if the side channel state from the side channel monitor does not match the side channel model, an error in the operation of the cryptographic engine is indicated.

FIG. 4 illustrates an example of a computer 400 which may be utilized by exemplary embodiments of an integrity-checking system including side channel monitoring. Various operations discussed above may utilize the capabilities of the computer 400. One or more of the capabilities of the computer 400 may be incorporated in any element, module, application, and/or component discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more I/O devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 460 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include enhanced integrity checking for a cryptographic engine by using side channel information that may also be used for side channel compensation purposes.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for integrity checking for a cryptographic engine in a computing system, comprising:
    monitoring a state of a side channel of the cryptographic engine during operation of the cryptographic engine by a side channel monitor;
    comparing the state of the side channel to a side channel model of the cryptographic engine to determine whether a mismatch exists between the state of the side channel and the side channel model;
    based on a mismatch between the state of the side channel and the model of the side channel, indicating an error in the cryptographic engine; and
    detecting the side channel of the cryptographic engine and determining the side channel model of the detected side channel during integration of the cryptographic engine with the computing system, wherein the model of the detected side channel is determined based on documentation of the cryptographic engine.

2. The method of claim 1, wherein the computing system comprises an encrypted data storage system.

3. The method of claim 1, wherein the side channel comprises timing data of the cryptographic engine.

4. The method of claim 1, wherein the side channel comprises electromagnetic emissions of the cryptographic engine.

5. The method of claim 1, wherein the side channel comprises power consumption of the cryptographic engine.

6. The method of claim 1, further comprising performing compensation for the side channel based on the monitored state of the side channel during operation of the cryptographic engine.

7. The method of claim 6, wherein compensation for the side channel comprises insertion of dummy operations into the operation of the cryptographic engine.

8. The method of claim 1, further comprising:
    calculating a checksum by the cryptographic engine during operation of the cryptographic engine;
    comparing the calculated checksum to a second checksum in a checksum module located externally to the cryptographic engine to determine whether a mismatch exists between the calculated checksum and the second checksum, wherein the comparison of the calculated checksum to the second checksum is performed in parallel with comparing the state of the side channel to the side channel model; and
    based on a mismatch between the calculated checksum and the second checksum, indicating an error in the cryptographic engine.

9. The method of claim 1, wherein the side channel monitor is located externally to the cryptographic engine.

10. A computer program product comprising a computer readable storage medium containing computer code that, when executed by a computer, implements a method for integrity checking for a cryptographic engine in a computing system, wherein the method comprises:
    monitoring a state of a side channel of the cryptographic engine during operation of the cryptographic engine by a side channel monitor;
    comparing the state of the side channel to a side channel model of the cryptographic engine to determine whether a mismatch exists between the state of the side channel and the side channel model;
    based on a mismatch between the state of the side channel and the model of the side channel, indicating an error in the cryptographic engine; and
    detecting the side channel of the cryptographic engine and determining the side channel model of the detected side channel during integration of the cryptographic engine with the computing system, wherein the model of the detected side channel is determined based on documentation of the cryptographic engine.

11. The computer program product according to claim 10, wherein the side channel comprises one of timing data, power consumption, and electromagnetic emissions of the cryptographic engine.

12. The computer program product according to claim 10, further comprising:
    calculating a checksum by the cryptographic engine during operation of the cryptographic engine;
    comparing the calculated checksum to a second checksum in a checksum module located externally to the cryptographic engine to determine whether a mismatch exists between the calculated checksum and the second checksum, wherein the comparison of the calculated checksum to the second checksum is performed in parallel with comparing the state of the side channel to the side channel model; and
    based on a mismatch between the calculated checksum and the second checksum, indicating an error in the cryptographic engine.

13. A computer system for integrity checking for a cryptographic engine in a computing system, the system comprising:
    a processor; and
    a memory, the system configured to perform a method comprising:
        monitoring a state of a side channel of the cryptographic engine during operation of the cryptographic engine by a side channel monitor;
        comparing the state of the side channel to a side channel model of the cryptographic engine to determine whether a mismatch exists between the state of the side channel and the side channel model;
based on a mismatch between the state of the side channel and the model of the side channel, indicating an error in the cryptographic engine; and
detecting the side channel of the cryptographic engine and determining the side channel model of the detected side channel during integration of the cryptographic engine with the computing system, wherein the model of the detected side channel is determined based on documentation of the cryptographic engine.

14. The computer system of claim 13, further comprising:
calculating a checksum by the cryptographic engine during operation of the cryptographic engine;
comparing the calculated checksum to a second checksum in a checksum module located externally to the cryptographic engine to determine whether a mismatch exists between the calculated checksum and the second checksum, wherein the comparison of the calculated checksum to the second checksum is performed in parallel with comparing the state of the side channel to the side channel model; and
based on a mismatch between the calculated checksum and the second checksum, indicating an error in the cryptographic engine.

15. The computer system of claim 13, wherein the side channel comprises one of timing data, power consumption, and electromagnetic emissions of the cryptographic engine.

16. A method for integrity checking for a cryptographic engine in a computing system, comprising:
monitoring a state of a side channel of the cryptographic engine during operation of the cryptographic engine by a side channel monitor;
comparing the state of the side channel to a side channel model of the cryptographic engine to determine whether a mismatch exists between the state of the side channel and the side channel model;
based on a mismatch between the state of the side channel and the model of the side channel, indicating an error in the cryptographic engine; and
detecting the side channel of the cryptographic engine and determining the side channel model of the detected side channel during integration of the cryptographic engine with the computing system, wherein the model of the detected side channel is determined based on one or more sensors that detect the side channel.

17. A method for integrity checking for a cryptographic engine in a computing system, comprising:
monitoring a state of a side channel of the cryptographic engine during operation of the cryptographic engine by a side channel monitor;
comparing the state of the side channel to a side channel model of the cryptographic engine to determine whether a mismatch exists between the state of the side channel and the side channel model;
based on a mismatch between the state of the side channel and the model of the side channel, indicating an error in the cryptographic engine; and
performing compensation for the side channel based on the monitored state of the side channel during operation of the cryptographic engine.

18. A computer program product comprising a computer readable storage medium containing computer code that, when executed by a computer, implements a method for integrity checking for a cryptographic engine in a computing system, wherein the method comprises:
monitoring a state of a side channel of the cryptographic engine during operation of the cryptographic engine by a side channel monitor;
comparing the state of the side channel to a side channel model of the cryptographic engine to determine whether a mismatch exists between the state of the side channel and the side channel model;
based on a mismatch between the state of the side channel and the model of the side channel, indicating an error in the cryptographic engine; and
detecting the side channel of the cryptographic engine and determining the side channel model of the detected side channel during integration of the cryptographic engine with the computing system, wherein the model of the detected side channel is determined based on one or more sensors that detect the side channel.

19. A computer program product comprising a computer readable storage medium containing computer code that, when executed by a computer, implements a method for integrity checking for a cryptographic engine in a computing system, wherein the method comprises:
monitoring a state of a side channel of the cryptographic engine during operation of the cryptographic engine by a side channel monitor;
comparing the state of the side channel to a side channel model of the cryptographic engine to determine whether a mismatch exists between the state of the side channel and the side channel model;
based on a mismatch between the state of the side channel and the model of the side channel, indicating an error in the cryptographic engine; and
performing compensation for the side channel based on the monitored state of the side channel during operation of the cryptographic engine.

20. A computer system for integrity checking for a cryptographic engine in a computing system, the system comprising:
a processor; and
a memory, the system configured to perform a method comprising:
monitoring a state of a side channel of the cryptographic engine during operation of the cryptographic engine by a side channel monitor;
comparing the state of the side channel to a side channel model of the cryptographic engine to determine whether a mismatch exists between the state of the side channel and the side channel model;
based on a mismatch between the state of the side channel and the model of the side channel, indicating an error in the cryptographic engine; and
detecting the side channel of the cryptographic engine and determining the side channel model of the detected side channel during integration of the cryptographic engine with the computing system, wherein the model of the detected side channel is determined based on one or more sensors that detect the side channel.

21. A computer system for integrity checking for a cryptographic engine in a computing system, the system comprising:
a processor; and
a memory, the system configured to perform a method comprising:
monitoring a state of a side channel of the cryptographic engine during operation of the cryptographic engine by a side channel monitor;

comparing the state of the side channel to a side channel model of the cryptographic engine to determine whether a mismatch exists between the state of the side channel and the side channel model;

based on a mismatch between the state of the side channel and the model of the side channel, indicating an error in the cryptographic engine; and performing compensation for the side channel based on the monitored state of the side channel during operation of the cryptographic engine.

* * * * *